United States Patent
Hiramatsu et al.

(10) Patent No.: US 7,483,239 B2
(45) Date of Patent: Jan. 27, 2009

(54) MAGNETIC DISK DRIVE WITH ADJUSTMENT OF ROTATIONAL BALANCE

(75) Inventors: Tomoki Hiramatsu, Kanagawa (JP);
Takahisa Okada, Kanagawa (JP);
Takeji Sumiya, Kanagawa (JP); Hitoshi Tsujino, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 332 days.

(21) Appl. No.: 11/282,289

(22) Filed: Nov. 18, 2005

(65) Prior Publication Data
US 2006/0119980 A1 Jun. 8, 2006

(30) Foreign Application Priority Data
Dec. 7, 2004 (JP) ............................. 2004-354078

(51) Int. Cl.
*G11B 17/02* (2006.01)
(52) U.S. Cl. .................................................. 360/99.08
(58) Field of Classification Search ........................ None
See application file for complete search history.

(56) References Cited

U.S. PATENT DOCUMENTS 5,130,870 A * 7/1992 Jabbari .................... 360/99.08
5,422,776 A * 6/1995 Thorson et al. ........... 360/98.07
7,064,923 B2 * 6/2006 Tran et al. ................ 360/99.08

FOREIGN PATENT DOCUMENTS

JP 07-013095 1/1995
JP 2000-184678 6/2000

* cited by examiner

*Primary Examiner*—Mark Blouin
(74) *Attorney, Agent, or Firm*—Townsend and Townsend and Crew LLP; John Henkhaus

(57) ABSTRACT

Embodiments of the invention provide, in a compact magnetic disk drive, a stable structure capable of reducing self-oscillation occurring from disk spinning, while suppressing generation of dust and dirt. In one embodiment, a magnetic disk is mounted on a hub of a spindle motor. A clamp is further attached to secure the magnetic disk in position. A plurality of opening portions are formed in the clamp around an axis. A counterweight formed of an elastic material is mounted in the opening portion by being press-fitted therein. The counterweight is less likely to generate dust and dirt through friction during insertion and looseness. A gap is provided between the clamp and the hub at locations near the opening portions. The counterweight has a protruded portion on a side surface of a circular column portion. The protruded portion slides into the gap between the clamp and the hub, counteracting a tendency of the counterweight to drop out of position.

18 Claims, 5 Drawing Sheets

(c)

(b)

(a)

MAGNETIC DISK DRIVE WITH ADJUSTMENT OF ROTATIONAL BALANCE

CROSS-REFERENCES TO RELATED APPLICATIONS

This application claims priority from Japanese Patent Application No. JP2004-354078, filed Dec. 7, 2004, the entire disclosure of which is incorporated herein by reference.

BACKGROUND OF THE INVENTION

The present invention relates generally to a magnetic disk drive and, more particularly, to an adjustment of a rotational balance after assembly of a disk assembly.

In recent years, efforts are being made to achieve a higher rotating speed of the disk in order to meet the need for an improved access performance in a 2.5-inch disk drive. Self-oscillation is involved here of the magnetic disk, arising from imbalance of a spindle motor itself or imbalance caused by eccentricity of different members of the magnetic disk after assembly. The self-oscillation tends to increase in proportion to the rotating speed of the disk to the second power. The effort made to increase the disk rotating speed in the 2.5-inch disk drive could make the self-oscillation more pronounced, resulting in inconveniences such as impaired quietness or the like.

Conventionally, effort has been made to reduce the self-oscillation by improving accuracy in aligning centers of gravity when the magnetic disk or clamps for holding the magnetic disk are assembled onto a hub (motor hub) of the spindle motor.

In a large-sized disk drive, approaches are taken to reduce the self-oscillation by placing a screw or driving a plastic pin as a counterweight at a position for canceling the imbalance. One patent reference is Japanese Patent Laid-open No. 2000-184678.

BRIEF SUMMARY OF THE INVENTION

There is a limit to existing accuracy in machining parts for attaching to the spindle motor, and in assembling these parts together. It is difficult to suppress appropriately, by improving this accuracy, the self-oscillation occurring in conjunction with the recent effort made to increase the rotating speed in the 2.5-inch disk drive. Further, it is difficult to adopt the arrangement of placing the screw in a compact disk drive, in which downsizing is at a premium, for the following reason. Specifically, the arrangement requires that a threaded hole be formed by machining the hub of the spindle motor. Moreover, there is a problem that fastening the screw involves generation of dust and dirt. On the other hand, the arrangement, in which the plastic pin is fitted into a hole, presents a problem, in which looseness occurs in the hole into which the pin is driven, causing dust and dirt to be generated.

It is therefore a feature of the present invention to provide a magnetic disk drive having a stable structure featuring the following. Specifically, the structure can be mounted in a narrow space in a compact magnetic disk drive. The structure suppresses generation of dust and dirt. The structure can reduce self-oscillation more easily than by improving assembly accuracy. The structure is further stable during high-speed spinning.

A magnetic disk drive according to an embodiment of the present invention includes a motor hub, a clamp board, a magnetic disk, and a counterweight. The clamp board serves as a sheet member mounted on the motor hub. The clamp board has opening portions passing through the sheet member. The opening portions are formed on a plurality of directional lines as viewed from a disk rotary axis. The magnetic disk is clamped by the motor hub and the clamp board. The counterweight is formed of an elastic material and mounted by being press-fitted into part of the plurality of opening portions. The clamp board is disposed by having a gap provided from the motor hub at a location near at least each of the plurality of opening portions. The counterweight includes a protruded portion on a side surface thereof. The protruded portion is to be engaged with the gap when the counterweight is mounted in the opening portion.

According to the present invention, the counterweight is formed of an elastic material and designed to be press-fitted into a hole. The diameter and depth of the hole can therefore be kept small. Looseness in the hole can also be prevented. Accordingly, space saving and prevention of generation of dust and dirt can be appropriately achieved. Further, the protruded portion provided on the side of the counterweight is designed to be slid into the gap between the clamp board and the motor hub. The counterweight is therefore stably held in position in the hole, opposing to a large acceleration during high-speed spinning.

DETAILED DESCRIPTION OF THE INVENTION

An exemplary embodiment (hereinafter referred to as the "embodiment") of the present invention will be described in detail with reference to the accompanying drawings.

Figure 1:
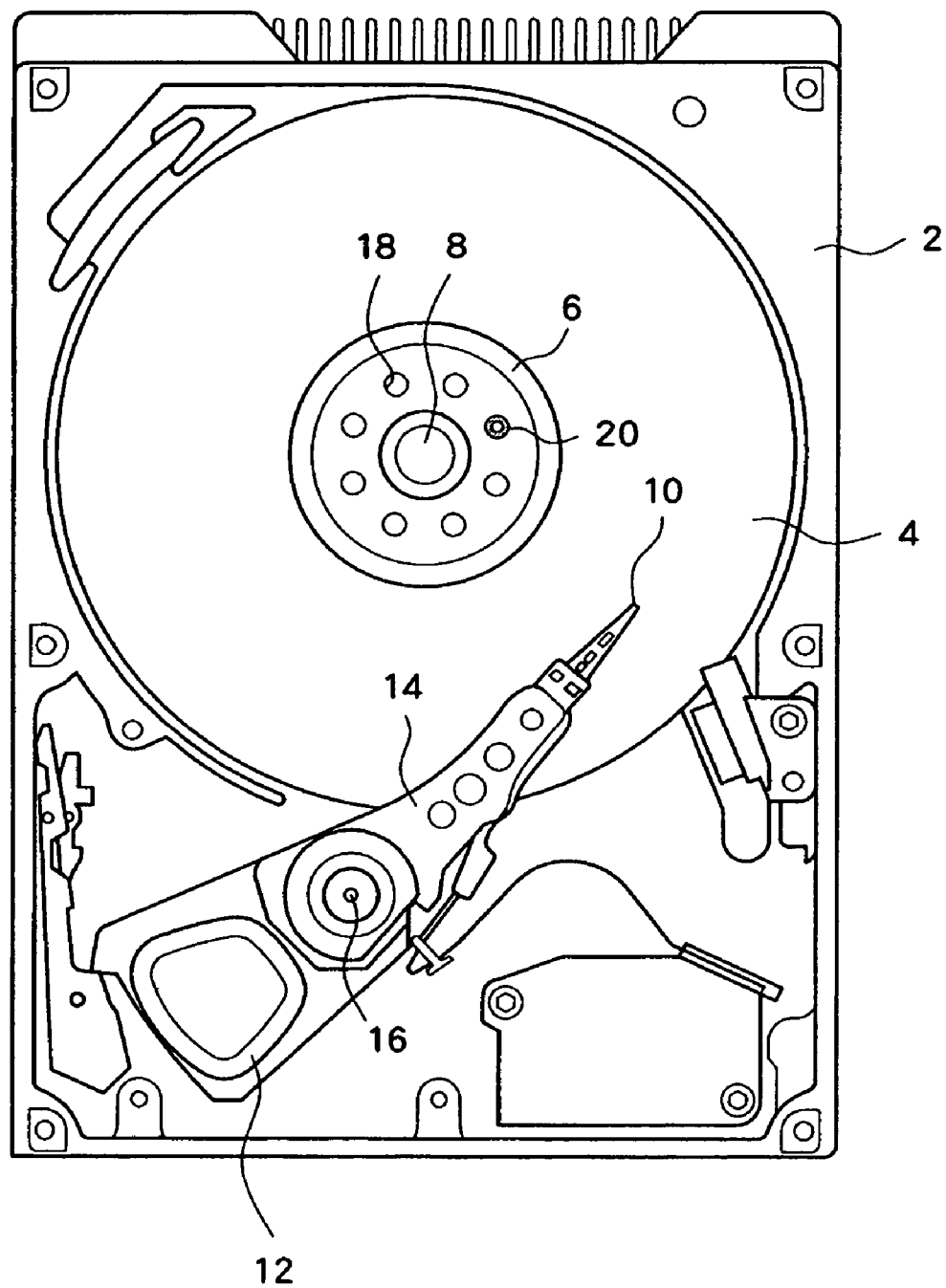
FIG. 1 is a plan view showing schematically a 2.5-inch magnetic disk drive according to an embodiment of the present invention.

FIG. 1 is a plan view showing schematically a 2.5-inch magnetic disk drive according to the embodiment of the present invention. The magnetic disk drive includes a magnetic disk 4 in a cabinet 2. The magnetic disk 4 is clamped between a hub of a spindle motor and a clamp (clamp plate) 6. The magnetic disk 4 is spun at high speed around a rotary axis 8 by the spindle motor. For example, in the magnetic disk drive according to the embodiment of the present invention, the magnetic disk 4 can be spun at about 7500 rpm. The spindle motor is hidden behind the clamp 6 and not visible in FIG. 1. The magnetic disk 4 includes concentrically formed tracks. A magnetic head 10 is held in close proximity to a surface of the magnetic disk 4, performing read/write operations along the track. The position of the magnetic head 10 along and relative to the track moves as the magnetic disk 4 spins. A movement (seek operation) of the magnetic head 10 across tracks is achieved by a voice coil motor 12. Specifically, the voice coil motor 12 causes a head arm 14 to pivot about a fulcrum 16.

Figure 2:
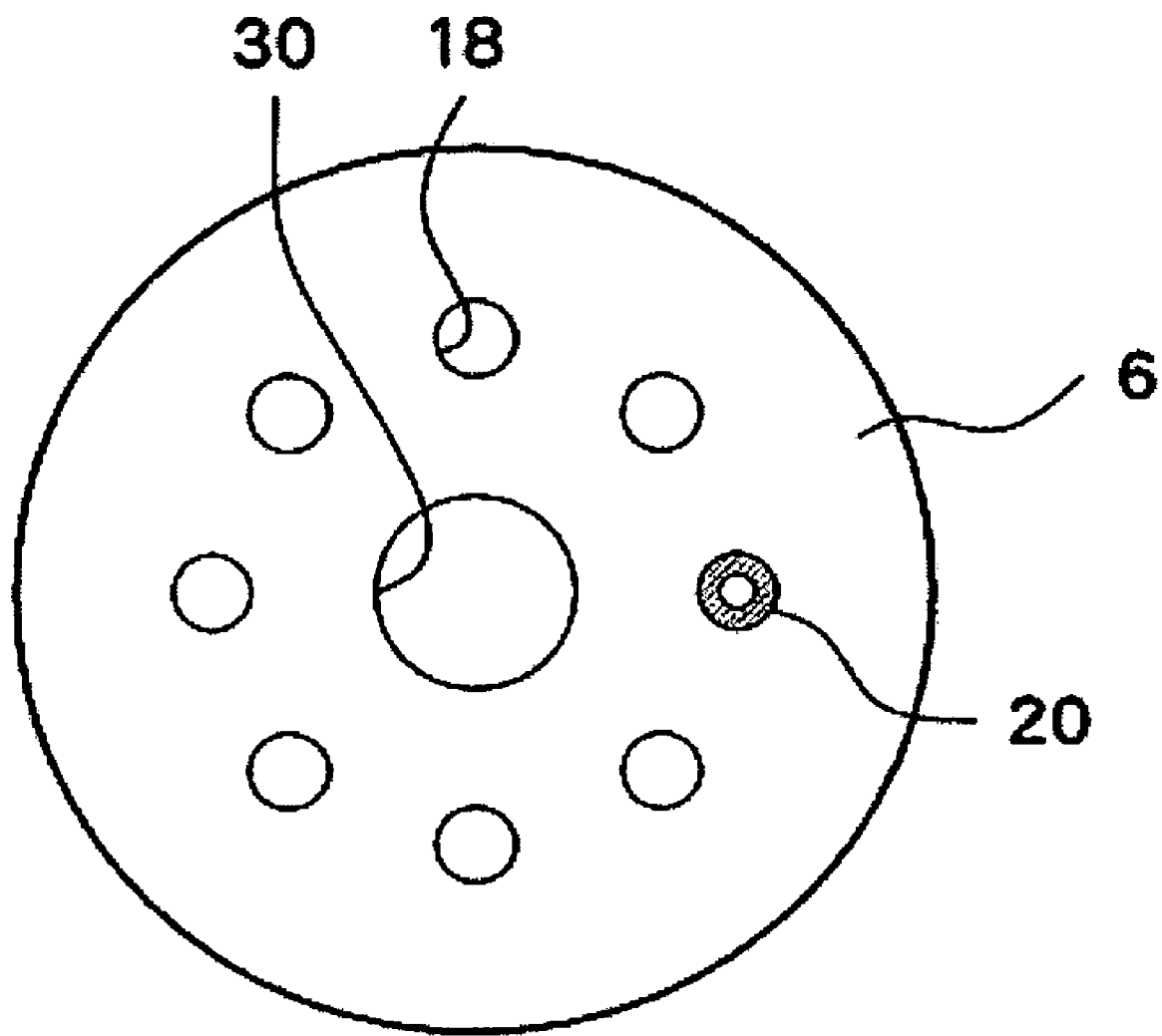
FIG. 2 is a plan view showing schematically a clamp.

FIG. 2 is a plan view showing schematically the clamp. The clamp 6 is a disk having an opening portion 30 formed at a center thereof. The clamp 6 serves as a fixing tool for clamping the magnetic disk 4 mounted on the hub. Formed around the opening portion 30 are, for example, eight equally spaced opening portions 18. A counterweight 20 to be described later is inserted into part of these opening portions 18. FIGS. 1 and 2 show the counterweight 20 inserted in one of these opening portions 18.

Figure 3:
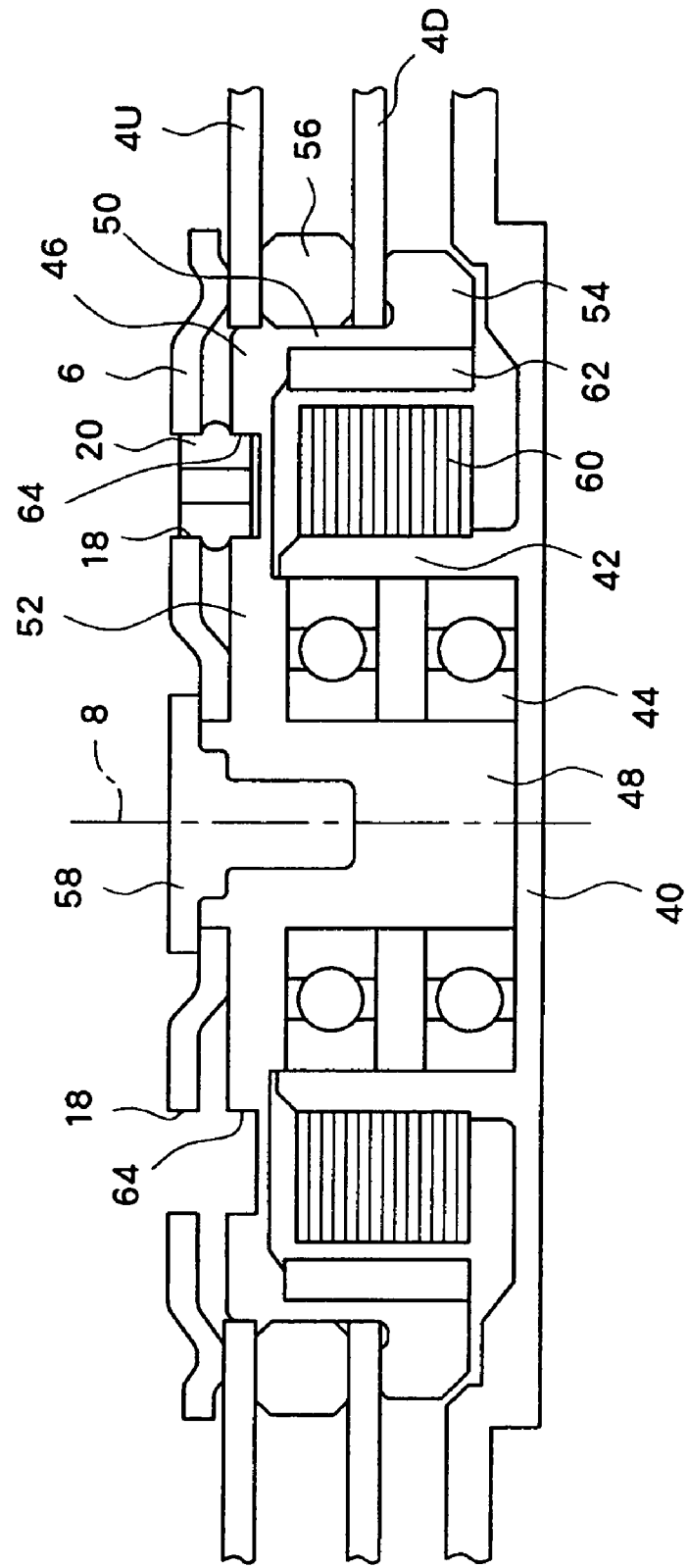
FIG. 3 is a cross sectional view showing schematically a disk assembly including a magnetic disk assembled to a spindle motor.

FIG. 3 is a cross sectional view showing schematically a disk assembly including the magnetic disk 4 assembled to the spindle motor. FIG. 3 is a cross section taken in a plane passing through the rotary axis 8 and the opening portion 18. A bearing sleeve 42 is formed integrally with a motor base 40. The bearing sleeve 42 has a cylindrical shape formed about the rotary axis 8 as its center. A shaft portion 48 integrated with a hub 46 is rotatably supported inside the bearing sleeve 42 via a bearing 44. The hub 46 includes the shaft portion 48, a drum portion 50, and a roof portion 52. The drum portion 50 is of a cylindrical shape having a central axis in common with the shaft portion 48. The roof portion 52 is of a disk shape connecting an upper end of the shaft portion 48 and an upper end of the drum portion 50.

An edge portion 54 is provided on a lower end of the drum portion 50. The edge portion 54 protrudes outwardly. The drum portion 50 has an outside diameter corresponding to a diameter of a circular opening portion provided at a center of the magnetic disk 4. The drum portion 50 is fitted into the circular opening portion in the magnetic disk 4. The magnetic disk drive according to the embodiment of the present invention is mounted with two magnetic disks 4. A lower magnetic disk 4D is locked onto the edge portion 54. An upper magnetic disk 4U is attached to the drum portion 50 after a ring-shaped spacer 56 is disposed around the drum portion 50 on top of the lower magnetic disk 4D.

Thereafter, the clamp 6 is placed on the roof portion 52 by being centrally aligned with the rotary axis 8. The clamp 6 is then secured to the hub 46 using a screw 58 screwed into the shaft portion 48 through the opening portion 30. The clamp 6 has a diameter larger than the outside diameter of the drum portion 50. An edge portion of the clamp 6 protruding from the drum portion 50 presses an upper surface of the upper magnetic disk 4U. This results in the two magnetic disks 4U, 4D stacked one on top of the other with the spacer 56 interposed therebetween being clamped by the edge portion 54 of the drum portion 50 and the clamp 6, and thus secured to the hub 46.

A plurality of stators 60 composed of electromagnets is arranged on an outer periphery of the bearing sleeve 42. A plurality of magnets 62 opposing the stators 60 is arranged on an inner peripheral surface of the drum portion 50.

As described earlier, the clamp 6 has the plurality of opening portions 18 arranged around the opening portion 30 at the center thereof. The clamp 6 is disposed in a position raised from the roof portion 52 in areas near these opening portions 18. That is, a gap is provided between the clamp 6 and the hub 46. The gap may be formed by curving the clamp 6 radially, thereby forming an arch between the opening portion 30 and the outer periphery. Specifically, referring to the cross sectional view shown in FIG. 3, a ring-shape plate forming the clamp 6 is bent so as to rise from an edge of the opening portion 30 toward the outer periphery. Further, the clamp 6 is also bent so as to rise from an edge of the outer periphery toward the center. This results in areas between these bends being raised from the roof portion 52. The areas correspond to portions, at which the opening portions 18 are provided.

A recessed portion 64 having a circular opening of the same size as the opening portion 18 is disposed in the roof portion 52 at a position corresponding to each of the opening portions 18. The recessed portions 64 are pre-formed so as to be aligned with the corresponding ones of the opening portions 18 when the center of the clamp 6 is brought into alignment with the center of the hub 46. Fine-adjustments of the position of the clamp 6 are made as detailed in the following when the clamp 6 is screwed in the hub 46. Specifically, the clamp 6 is placed on the hub 46 such that the opening portions 18 are aligned with the recessed portions 64. Then, a bar having a diameter corresponding to the shape of the opening in each of the opening portions 18 and the recessed portions 64 is inserted from each of the opening portions 18 into the corresponding one of the recessed portions 64 thereunder. The recessed portions 64 are used, as such, for ensuring accuracy in alignment between the clamp 6 and the hub 46. The recessed portions 64 are, accordingly, disposed at positions opposing the opening portions 18.

In the magnetic disk drive according to the embodiment of the present invention, the counterweight 20 is inserted until a lower end thereof bottoms in the recessed portion 64. The counterweight 20 is mounted in position where the magnetic disks 4U, 4D, the spacer 56, the clamp 6, the screw 58, and the like have been assembled together to the spindle motor including the hub 46 and the like. Specifically, a spinning part basic assembly completed by including the magnetic disk 4 is spun or otherwise operated by the spindle motor in accordance with actual operating conditions. A balance measuring machine is then used to measure rotating imbalance of the basic assembly. Based on this measurement, an opening portion 18 is selected, in which the counterweight 20 is to be inserted to compensate for the rotating imbalance. The counterweight 20 is then inserted in that particular opening portion 18. According to the measurement, one or two mutually adjoining opening portions 18 are selected as a rule. It is nonetheless appropriate that more opening portions 18 be selected as appropriately.

Figure 4:
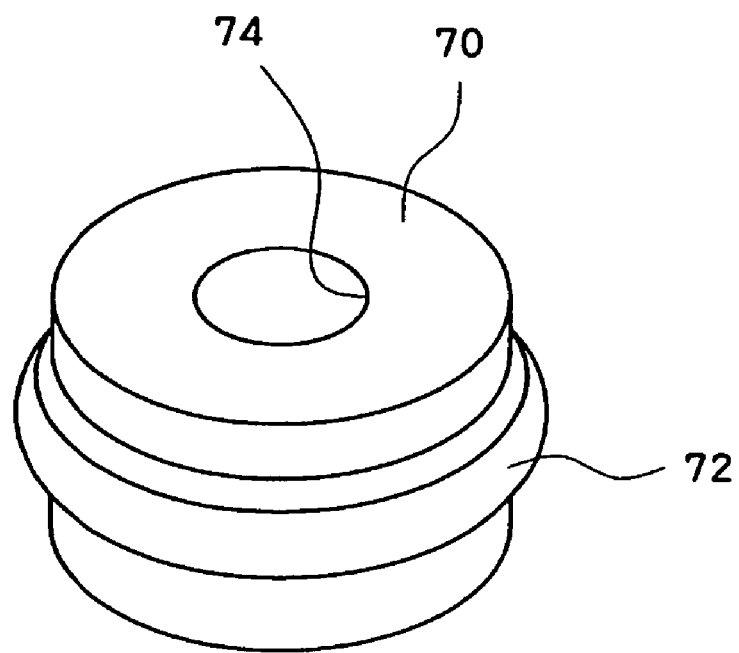
FIG. 4 is a perspective view showing schematically a counterweight.
Figure 5:
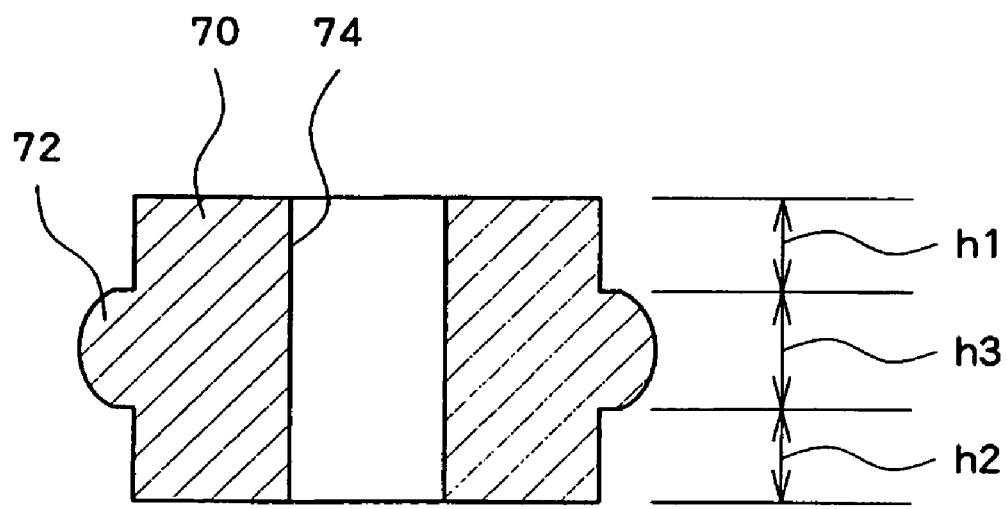
FIG. 5 is a vertical cross sectional view showing schematically the counterweight.

FIG. 4 is a perspective view showing schematically the counterweight 20. FIG. 5 is a vertical cross sectional view showing schematically the counterweight 20. The counterweight 20 has a basic shape of a column corresponding to the shape of the opening in the opening portion 18, including a protruded portion formed on a side surface thereof. In the magnetic disk drive according to the embodiment of the present invention, the opening portion 18 is circular. Accordingly, the counterweight 20 has an outline combining a circular column portion 70 with a protruded portion 72 annularly surrounding an entire periphery of a side surface thereof. Further, the counterweight 20 has an opening portion 74 formed along a central axis of the circular column portion 70. The protruded portion 72 may be formed, for example, to have a width h3. The width h3 is a remainder of a total distance between upper and lower end faces of the circular column portion 70 less a distance h1 and a distance h2. The width h3 of the protruded portion 72 is set in accordance with the gap between the clamp 6 and the roof portion 52. The protruded portion 72 is designed to slide into the gap when the counterweight 20 is mounted in the opening portion 18. The distance h1 between the protruded portion 72 and the upper end of the circular column portion 70 and the distance h2 between the protruded portion 72 and the lower end of the circular column portion 70 are set, for example, according to a thickness of the clamp 6 or a depth of the recessed portion 64 of the hub 46. Specifically, for example, the distance hi is set to be smaller than the thickness of the clamp 6 such that the upper end of the circular column portion 70 does not protrude from the opening portion 18 when the counterweight 20 is inserted in the opening portion 18. Similarly, the distance h2 and the depth of the recessed portion 64 can be set such that a portion of the circular column portion 70 below the protruded portion 72 fits completely in the recessed portion 64. In addition to these requirements, the counterweight 20 used with the magnetic disk drive according to the embodiment of the present invention is structured symmetrically about the width h3 by having a dimension of the distance h1 identical to that of the distance h2. This eliminates the need for ensuring correct up-and-down orientation of the counterweight 20 when mounting the counterweight 20. Mounting work is thus simplified.

The counterweight 20 is formed of an elastic material. When the counterweight 20 is inserted into the opening portion 18, the protruded portion 72 receives stress from an edge or an inner surface of the opening portion 18. This causes the counterweight 20 to be elastically deformed, allowing the protruded portion 72 to pass through the opening portion 18. On reaching the gap beneath the gap, the protruded portion 72 restores to original state, sliding into the gap. With a view to ensuring that the protruded portion 72 smoothly passes through the opening portion 18 or suppressing generation of dust and dirt through friction during passage, the protruded portion 72 may be formed into a convex shape as detailed in the following. Specifically, the height of the protruded portion 72 from the side surface of the circular column portion 70 is the maximum at a center of the width h3. The height is smaller toward the ends. The protruded portion of the counterweight 20 of the magnetic disk drive according to the embodiment of the present invention has a rounded convex shape as shown in FIG. 5.

Figure 6:
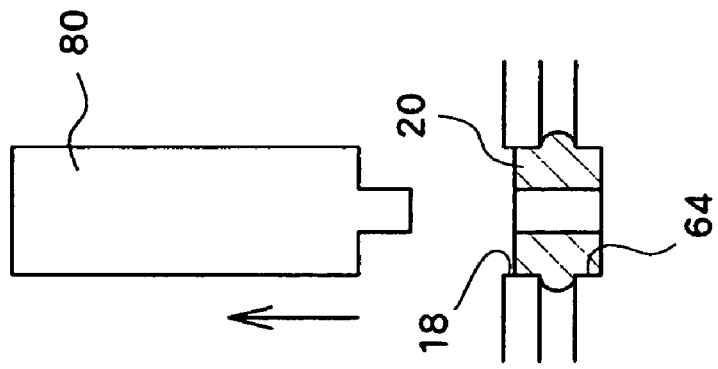
FIGS. 6(a), 6(b), and 6(c) are explanatory views showing schematically a mounting method of the counterweight.
Figure 6:
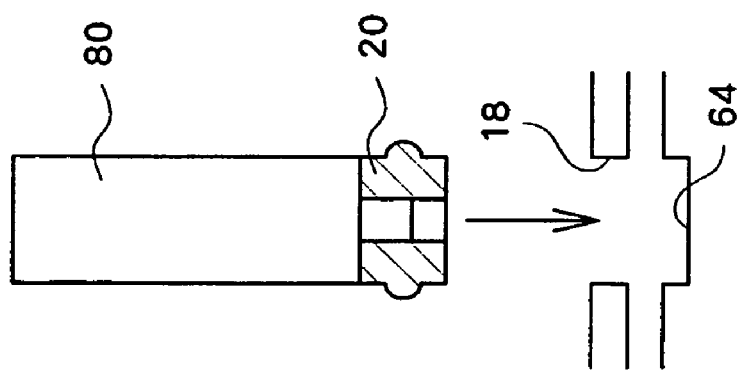
Figure 6:
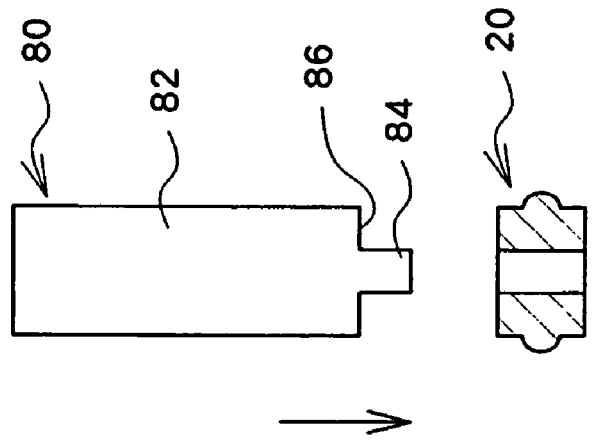

FIGS. 6(a), 6(b), and 6(c) are explanatory views showing schematically a mounting method of the counterweight 20. Mounting of the counterweight 20 to the disk assembly can be achieved easily by using a bar jig 80. The jig 80 is a shaft having a step formed on its leading end. The jig 80 includes a shaft 82 and a leading end pin 84 formed thinner than the shaft 82. The leading end pin 84 has a shape to be fit into the opening portion 74 in the counterweight 20. The leading end pin 84 is inserted into the opening portion 74 (FIG. 6(a)) to make the counterweight 20 held at the leading end of the jig 80. In this condition, the jig 80 is moved to a position above the opening portion 18 and the counterweight 20 held at the leading end is inserted into the opening portion 18 (FIG. 6(b)). The counterweight 20 has the circular column portion 70, the diameter of which is determined such that the counterweight 20 exerts an adequate pressure to the opening portion 18 and the recessed portion 64, and has the protruded portion 72. The counterweight 20 therefore receives an upward drag from the opening portion 18 and the recessed portion 64 during insertion therein. At this time, a shoulder portion 86 of the jig 80 at a root of the leading end pin 84 and the shaft 82 presses a top surface of the counterweight 20. This allows the counterweight 20 to be pushed into the opening portion 18 and the recessed portion 64 easily. After the counterweight 20 has been pushed into the opening portion 18 and the recessed portion 64, the jig 80 is retracted upward. At this time, the counterweight 20 can be left mounted in the opening portion 18 by a friction force produced on surfaces in contact with the opening portion 18 and the recessed portion 64 and a force encountered as the protruded portion 72 fitted in the gap is locked in the opening portion 18. This allows the jig 80 only to be pulled out (FIG. 6(c)).

As described earlier, the counterweight 20 is formed of an elastic material. Possible elastic materials to be used include, for example, a synthetic rubber such as styrene-butadience rubber, butadiene rubber, butyl rubber, ethylene propylene rubber, nitrile rubber, chloroprene rubber, fluororubber, silicone rubber, and urethane rubber, and a natural rubber. In addition, an elastomeric material, such as a styrene-based elastomer, an olefin-based elastomer, an urethane-based elastomer, and an ester-based elastomer may be used.

The material for the counterweight 20 is selected in consideration of the specific gravity thereof, in addition to the requirement that the material be elastic. The counterweight 20 is, as its name implies, highly significant when its weight ensures rotating balance. The weight of the counterweight 20 can be regulated to some extent by the size thereof. Making the counterweight 20 large, however, makes it necessary to enlarge the opening portion 18 and the recessed portion 64. With the trend in need toward reduction in size of the magnetic disk drive, enlarging the opening portion 18 and the recessed portion 64 could result in a reduction of the strength of the clamp 6 and the hub 46. There is therefore a limit to regulation of the size of the counterweight 20. Accordingly, it becomes important to select the specific gravity of the material used for the counterweight 20. For example, to adjust the specific gravity, any of the aforementioned rubbers and the like may be used as a base material, with which a metal filler or the like is mixed.

Further, it is preferable that a material or a shape that is less likely to cause dust and dirt be produced during press-fitting in the opening portion 18 and the recessed portion 64 be selected for the counterweight 20. The aforementioned rubbers and the like meet this requirement, too.

The counterweight 20 formed of the elastic material as described above is mounted in the disk assembly by being press-fitted into the opening portion 18 and the recessed portion 64. As a result, there is an increase in the friction force between the counterweight 20 and the inner surfaces of the opening portion 18 and the recessed portion 64. The counterweight 20 can therefore be appropriately prevented from falling off by a centrifugal force or the like occurring from high-speed spinning of the disk assembly. Further, the protruded portion 72 of the counterweight 20 is locked by the clamp 6. This prevents the counterweight 20 from coming off even more positively.

As described in the foregoing, the magnetic disk drive according to the embodiment of the present invention has a stable structure that achieves the following effects. Specifically, the structure reduces self-oscillation by controlling the rotating balance using the counterweight featuring a space-saving body and suppression of production of dust and dirt. The structure also prevents the counterweight from falling off during high-speed spinning.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive, comprising:
   a motor hub;
   a clamp board serving as a sheet member mounted on the motor hub and having opening portions passing through the sheet member formed on each of a plurality of directional lines as viewed from a disk rotary axis;
   a magnetic disk clamped by the motor hub and the clamp board; and
   a counterweight formed of an elastic material and mounted by being disposed into at least one of the plurality of opening portions;
   wherein the motor hub has a recessed portion formed at a position opposing the opening portion in the clamp board;
   wherein the clamp board is disposed by having a gap provided from the motor hub at a location near at least each of the plurality of opening portions; and
   wherein the counterweight includes a protruded portion on a side surface thereof, the protruded portion being engaged with the gap when mounted in the opening portion;
   wherein the counter weight includes an upper portion and a lower portion that are symmetrical and formed on opposite sides of the protruded portion,
   wherein the lower portion of the counter weight corresponds to the depth of the recessed portion of the motor hub.

2. The magnetic disk drive according to claim 1,
   wherein the counterweight is mounted in a disk assembly including the magnetic disk secured to the motor hub using the clamp board and a mounting position of the counterweight is selected from among the plurality of opening portions according to a rotational balance of the disk assembly.

3. The magnetic disk drive according to claim 1, wherein the opening portions are formed at predetermined spaced intervals on a circumference of a circle having the rotary axis as a center thereof.

4. The magnetic disk drive according to claim 1, wherein the counterweight has an outline including a portion of a generally circular column shape combined with an annular protruded portion running along a circumference of a side surface of the circular column portion.

5. The magnetic disk drive according to claim 4, wherein the counterweight includes an opening portion formed along an axis of the circular column portion.

6. The magnetic disk drive according to claim 1, wherein the opening portion formed in the clamp board has an opening of a circular shape; and the recessed portion having a circular opening of a size corresponding to the shape of the opening.

7. The magnetic disk drive according to claim 6, wherein the counterweight has an outline including a portion of a generally circular column shape combined with an annular protruded portion running along a circumference of a side surface of the circular column portion, the annular protruded portion being located at a position a predetermined separating length away from each of upper and lower ends of the circular column portion.

8. The magnetic disk drive according to claim 1, wherein the counterweight includes a filler material mixed with the elastic material, the filler material having a greater specific gravity than the elastic material.

9. The magnetic disk drive according to claim 1, wherein the elastic material includes at least one of styrene-butadience rubber, butadiene rubber, butyl rubber, ethylene propylene rubber, nitrile rubber, chloroprene rubber, fluororubber, silicone rubber, urethane rubber, a styrene-based elastomer, an olefin-based elastomer, an urethane-based elastomer, and an ester-based elastomer.

10. A method of assembling a magnetic disk drive, the method comprising:
providing a motor hub;
mounting a clamp board serving as a sheet member on the motor hub and having opening portions passing through the sheet member formed on each of a plurality of directional lines as viewed from a disk rotary axis;
clamping a magnetic disk by the motor hub and the clamp board; and
mounting a counterweight formed of an elastic material by being press-fitted into at least one of the plurality of opening portions;
wherein the motor hub has a recessed portion formed at a position opposing the opening portion in the clamp board;
wherein the clamp board is disposed by having a gap provided from the motor hub at a location near at least each of the plurality of opening portions; and
wherein the counterweight includes a protruded portion on a side surface thereof, the protruded portion being engaged with the gap when mounted in the opening portion;

wherein the counterweight includes an upper portion and a lower portion that are symmetrical and formed on opposite sides of the protruded portion;
wherein the lower portion of the counter weight corresponds to the depth of the recessed portion of the motor hub.

11. The method of assembling a magnetic disk drive according to claim 10, wherein the counterweight is mounted in a disk assembly including the magnetic disk secured to the motor hub using the clamp board and a mounting position of the counterweight is selected from among the plurality of opening portions according to a rotational balance of the disk assembly.

12. The method of assembling a magnetic disk drive according to claim 10, wherein the opening portions are formed at predetermined spaced intervals on a circumference of a circle having the rotary axis as a center thereof.

13. The method of assembling a magnetic disk drive according to claim 10, wherein the counterweight has an outline including a portion of a generally circular column shape combined with an annular protruded portion running along a circumference of a side surface of the circular column portion.

14. The method of assembling a magnetic disk drive according to claim 13, wherein the counterweight includes an opening portion formed along an axis of the circular column portion.

15. The method of assembling a magnetic disk drive according to claim 10, wherein the opening portion formed in the clamp board has an opening of a circular shape; and
the recessed portion having a circular opening of a size corresponding to the shape of the opening.

16. The method of assembling a magnetic disk drive according to claim 15, wherein the counterweight has an outline including a portion of a generally circular column shape combined with an annular protruded portion running along a circumference of a side surface of the circular column portion, the annular protruded portion being located at a position a predetermined separating length away from each of upper and lower ends of the circular column portion.

17. The method of assembling a magnetic disk drive according to claim 10, wherein the counterweight includes a filler material mixed with the elastic material, the filler material having a greater specific gravity than the elastic material.

18. The method of assembling a magnetic disk drive according to claim 10, wherein the elastic material includes at least one of styrene-butadience rubber, butadiene rubber, butyl rubber, ethylene propylene rubber, nitrile rubber, chloroprene rubber, fluororubber, silicone rubber, urethane rubber, a styrene-based elastomer, an olefin-based elastomer, an urethane-based elastomer, and an ester-based elastomer.

* * * * *